(12) United States Patent
Das

(10) Patent No.: US 6,911,938 B1
(45) Date of Patent: Jun. 28, 2005

(54) TRANSMIT-RECEIVE MULTIBEAM TELECOMMUNICATIONS SYSTEM WITH REDUCED NUMBER OF AMPLIFIERS

(75) Inventor: Satyendranath Das, Mt. View, CA (US)

(73) Assignee: Manoj Bhattacharyya

( * ) Notice: Subject to any disclaimer, the term of this patent is extended or adjusted under 35 U.S.C. 154(b) by 0 days.

(21) Appl. No.: 08/832,117

(22) Filed: Apr. 3, 1997

Related U.S. Application Data

(63) Continuation of application No. 08/665,309, filed on Jun. 17, 1996, now Pat. No. 5,745,077, and a continuation of application No. 08/651,744, filed on May 22, 1996, now abandoned.

(51) Int. Cl.⁷ ............................................. H04B 7/185
(52) U.S. Cl. ..................................... 342/354; 455/13.3
(58) Field of Search ................................ 342/352, 353, 342/354, 374; 455/12.1, 13.3, 13.4, 427, 428

(56) References Cited

U.S. PATENT DOCUMENTS

| | | | | |
|---|---|---|---|---|
| 4,381,562 A | * | 4/1983 | Acampora | ................. 455/12.1 |
| 4,823,136 A | * | 4/1989 | Nathanson et al. | ......... 342/368 |
| 4,827,268 A | * | 5/1989 | Rosen | ....................... 342/368 |
| 5,105,200 A | * | 4/1992 | Koepf | ................. 343/700 MS |
| 5,289,193 A | * | 2/1994 | Lenormand et al. | ........ 342/374 |
| 5,422,647 A | * | 6/1995 | Hirshfield et al. | .......... 342/354 |
| 5,539,415 A | * | 7/1996 | Metzen et al. | ....... 343/700 MS |
| 5,545,924 A | * | 8/1996 | Contolatis et al. | .......... 257/724 |
| 5,790,601 A | * | 8/1998 | Corrigan, III et al. | ...... 375/302 |
| 5,835,487 A | * | 11/1998 | Campenalla | ................ 370/316 |

\* cited by examiner

*Primary Examiner*—Gregory C. Issing

(57) ABSTRACT

This invention reduces the number of amplifiers needed and thus reduces the weight of a multi-beam transmitting system. Each input beam is connected respectively to each switched terminal of an input switch. The fixed terminal of the input switch is connected to the input of an amplifier the output of which is connected to the fixed terminal of an output switch. Each switched terminal of the output switch is connected respectively to transmit feeds which are located off-set from the prime focus of a transmit reflector antenna. Both the input and the output switches are switched synchronously. The invention includes MMIC and high Tc superconducting transmit systems. The invention includes design to prevent single point failures and a design to transmit a large amount of RF power.

5 Claims, 5 Drawing Sheets

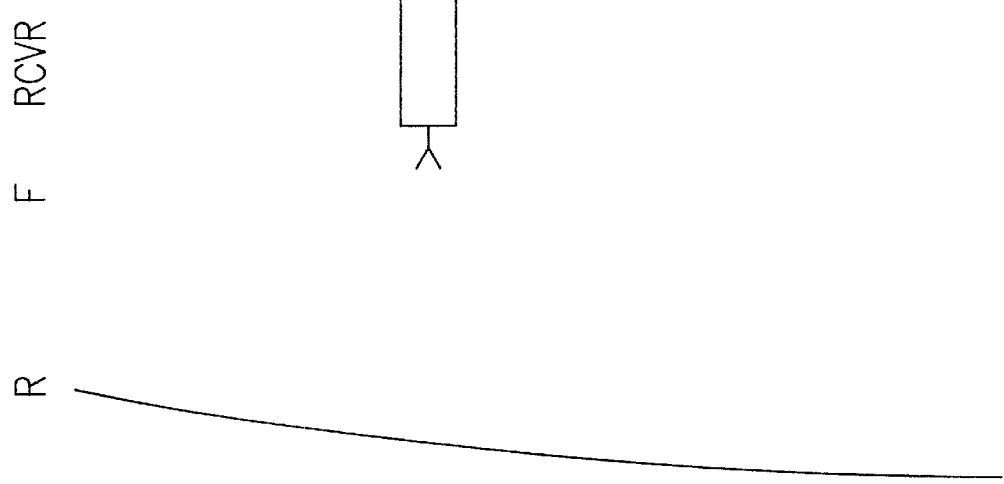

TRANSMIT-RECEIVE MULTIBEAM TELECOMMUNICATIONS SYSTEM WITH REDUCED NUMBER OF AMPLIFIERS

This application is a continuation of the application Ser. No. 08/651,744 filed May 22, 1996 now abandoned and Ser. No. 08/665,309 filed Jun. 17, 1996 now U.S. Pat. No. 5,745,077.

REFERENCES

1. Ser. Nos. 08/186,277 and 08/190,533 both now abandoned.

FIELD OF INVENTION

1. The present invention relates to multibeam transmit-receive telecommunication systems.

2. In telecommunications, it is sometimes necessary to transmit and receive using multiple beams.

DESCRIPTION OF PRIOR ART

Das discussed satellite multibeam antennas. S. Das, "Multibeam Antennas Improve Satellite Communications", pp. 42–55, MSN, December 1977. "An Adaptive Multiple Beam System Concept", IEEE Journal of Selected Areas in Communications, vol. SAC-4, No.5, p. 630, 1987 has been discussed. U.S. Pat. Nos. 4,907,004 and 5,550,550 have been issued. The main difference between the U.S. Pat. No. 5,550,550 and the present application is the number of amplifiers needed. In previous art, such as U.S. Pat. No. 5,550,550, 16 amplifiers are needed for a 16 beam system. In this disclosure, only one amplifier is needed for a 16 beam system.

SUMMARY OF THE INVENTION

The transmitting system is a part of a satellite system. Examples are INTELSAT system, INMARSAT system, Skynet, Teledesic, Odyssey, Globalstar, Irridium, and regional cellular satellite system. The transmitting system is a terrestrial system, it is space borne, it is on aircraft, it is on a ship. The transmitting system is a part of a communication system, a radar system, radio determination system, wireless system, cellular system, or paging system. One object of this invention is to reduce the number of amplifiers needed. For a 90 beam system, in the previous art, 90 separate amplifiers are needed. In this invention, if 5 groups of a 16 beam system and one group of a 10 beam system are used, then the total number of amplifiers required is 6 compared to 90 required by the previous art. Another object of the invention is to reduce the weight of the transmitting system. A third objective is to reduce the cost of the transmitting system. The objectives are attained by connecting each input beam (IN) to each switched terminal of an input switch (ISW). The fixed terminal of the input switch is connected to the input of an amplifier (A) the output of which is connected to the fixed terminal of an output switch (OSW). Each switched terminal of the output switch is connected to an output (OUT) line which is connected to a transmit feed or feed element (F). The feeds are located off-set from the prime focus of a transmit reflector (R) antenna. Both the input and the output switches are rotated synchronously. The samples of each beam are summed in each receiver forming the signal of each output beam respectively. The larger the number of beams and larger the number of throws of the switches, the greater is the reduction in the number of amplifiers. Another object of this invention is to design and construct a part or the whole of the transmitting system in a monolithic microwave integrated circuit (MMIC) configuration.

Another objective of this invention is to implement a portion or the entire system in a monolithic microwave integrated circuit (MMIC) technology. Another objective of this invention is to use a conductive deposition of a film of single crystal high Tc superconductor, such as YBCO, TBCCO, for a portion or the entire system and operate the system at a high superconducting temperature, currently between 75 and 105 degrees Kelvin, and thus reduce the conductive losses of the system. U.S. Pat. No. 5,409,889 includes a MMIC high Tc superconducting microwave device.

Another objective is to build very low conductive loss high Tc superconductive waveguide multibeam transmitters. All the components, in the waveguide embodiment, are made of a single crystal high Tc superconductor such as YBCO, TBCCO. The waveguide feed elements and the reflector antenna are also made of a single crystal high Tc superconductor including YBCO, TBCCO. In another waveguide embodiment, all the components, including waveguide feed elements are made of a single crystal dielectric material, such as sapphire, lanthanum aluminate, having interior surfaces which are deposited with a film of a single crystal high Tc superconductor such as YBCO, TBCCO. The reflector antenna is also made of a single crystal dielectric material such as sapphire, lanthanum aluminate, having reflecting surfaces which are deposited with a film of a single crystal high Tc superconductor. The high Tc superconducting transmitters are operated at a high superconducting temperature currently above 77 degrees K. A Q of one million, for high Tc superconducting microwave devices, has been demonstrated. G. Shen, C. Wilker, P. Pang and W. C. Holstein, "High Tc Superconducting-sapphire Microwave resonator with Extremely High Q-Values up To 90 K," IEEE MTT-S, Digest, pp. 1903–196, 1992. U.S. Pat. Nos. 5,407,904 and 5,407,905 have been issued on high Tc superconducting microwave devices.

One objective of this invention is to save the weight requirement of a telecommunication system. The actual savings can be calculated only in specific cases. For a system with a large number of beams, clusters of a smaller number of beams could be used. For example for a 90 beam system, 11 clusters of 8-beams and one cluster of a 2 beam system could be used. The relation between the power, weight and cost of a satellite system has been studied by Grady H. Stevens, Role of New Technology Satellites in Providing T1 and Higher Rate Service, NASA, LeRC, Cleveland, Ohio, January, 1994. On p. 26 of the cited report, Loral estimated for BISDN the satellite dry mass at 1548 kg and the array power at 3204 watts. Also the nonrecurring cost was estimated as $269 M and the recurring cost $419 M (2 spacecraft buy '93 $). The total cost was $688 M.

With these and other objectives in view, as will be more particularly pointed out in detail in the appended claims, reference is now made to the following description taken in connection with accompanying diagrams.

BRIEF DESCRIPTION OF THE DRAWINGS

FIG. 5 depicts a design of a receiving area.

DETAILED DESCRIPTION OF THE PREFERRED EMBODIMENT

Figure 1:
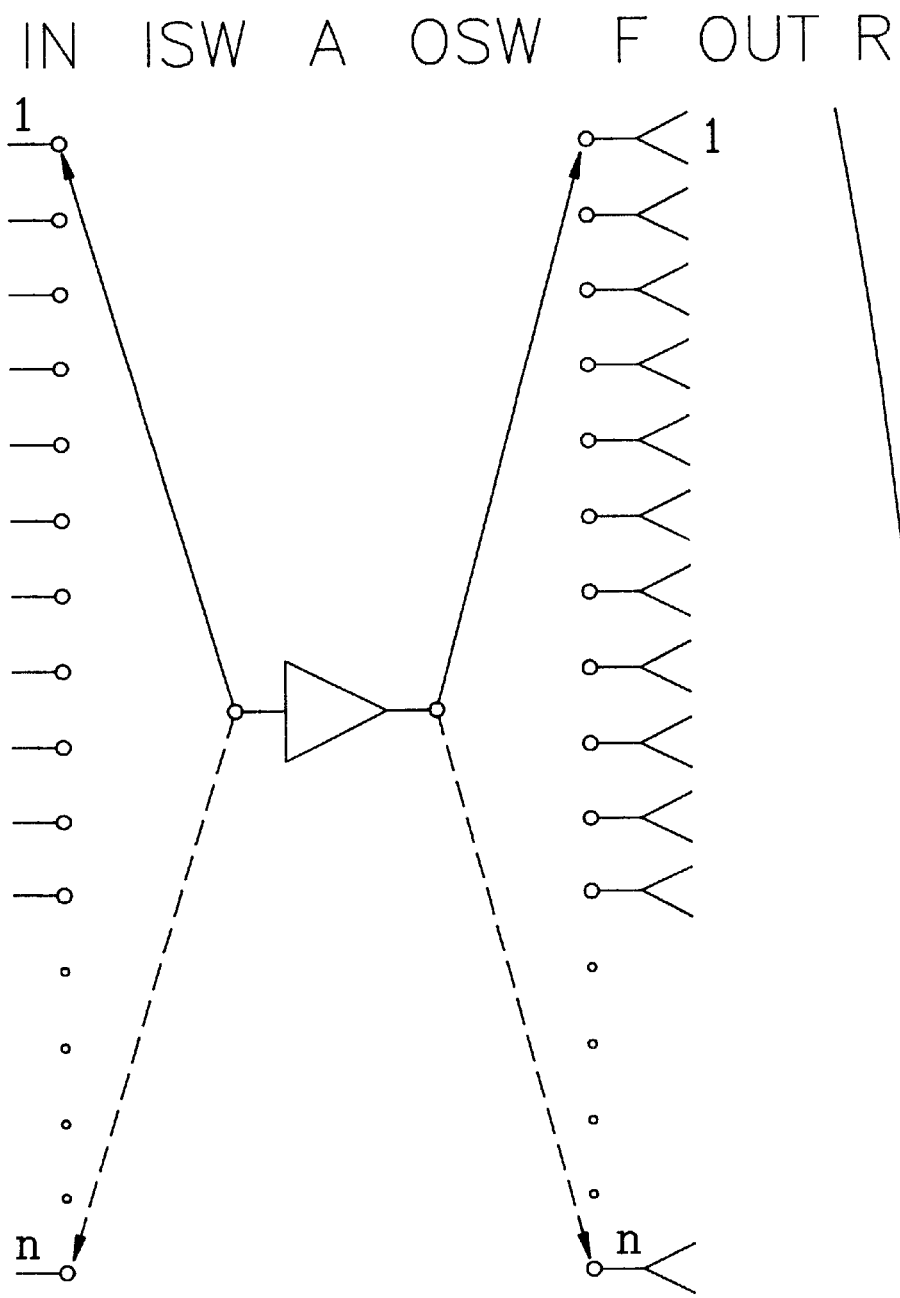
FIG. 1 depicts one embodiment of this invention.

FIG. 1 depicts one embodiment of this invention. There are 1 through n input (IN) beams. Each of the input (IN) beams are connected to each switched terminal of an input switch (ISW). The fixed terminal of the input switch (ISW) is connected to the input terminal of an amplifier (A). The output terminal of the amplifier (A) is connected to the fixed terminal of an output switch (OSW). Each switched terminal of the output switch (OSW) is respectively connected to a feed (F) or feed element. The feeds are located off-set from the prime focus of a reflector (R) antenna. The input switch (ISW) and the output switch (OSW) are switched synchronously. At any one time, the input beam 1 is connected to transmit feed (F) 1 forming an output (OUT) beam 1 which is transmitted by the transmit reflector (R) to a receiving area 1. Next the input (IN) beam 2 is connected to the transmit feed 2 forming an output (OUT) beam 2 which is transmitted by the transmit reflector (R) antenna to another receiving area 2. The input (IN) beams 3 through n are respectively connected to transmit feeds (F) 3 through n forming output (OUT) beams 3 through n which are transmitted by the transmit reflector (R) antenna respectively to 3 through n receiving areas. In another embodiment the transmit feeds (F) are located at or near the prime focus of the transmit reflector (R) antenna. In this embodiment, there are 1 through n input (IN) beams, there is one input switch having 1 through n switched terminals and one fixed terminal, one amplifier, one output switch having 1 through n switched terminals and one fixed terminal, 1 through n transmit feeds respectively producing corresponding 1 through n output beams, and one transmit reflector antenna to transmit 1 through n output beams to 1 through n receiving areas respectively.

Figure 2:
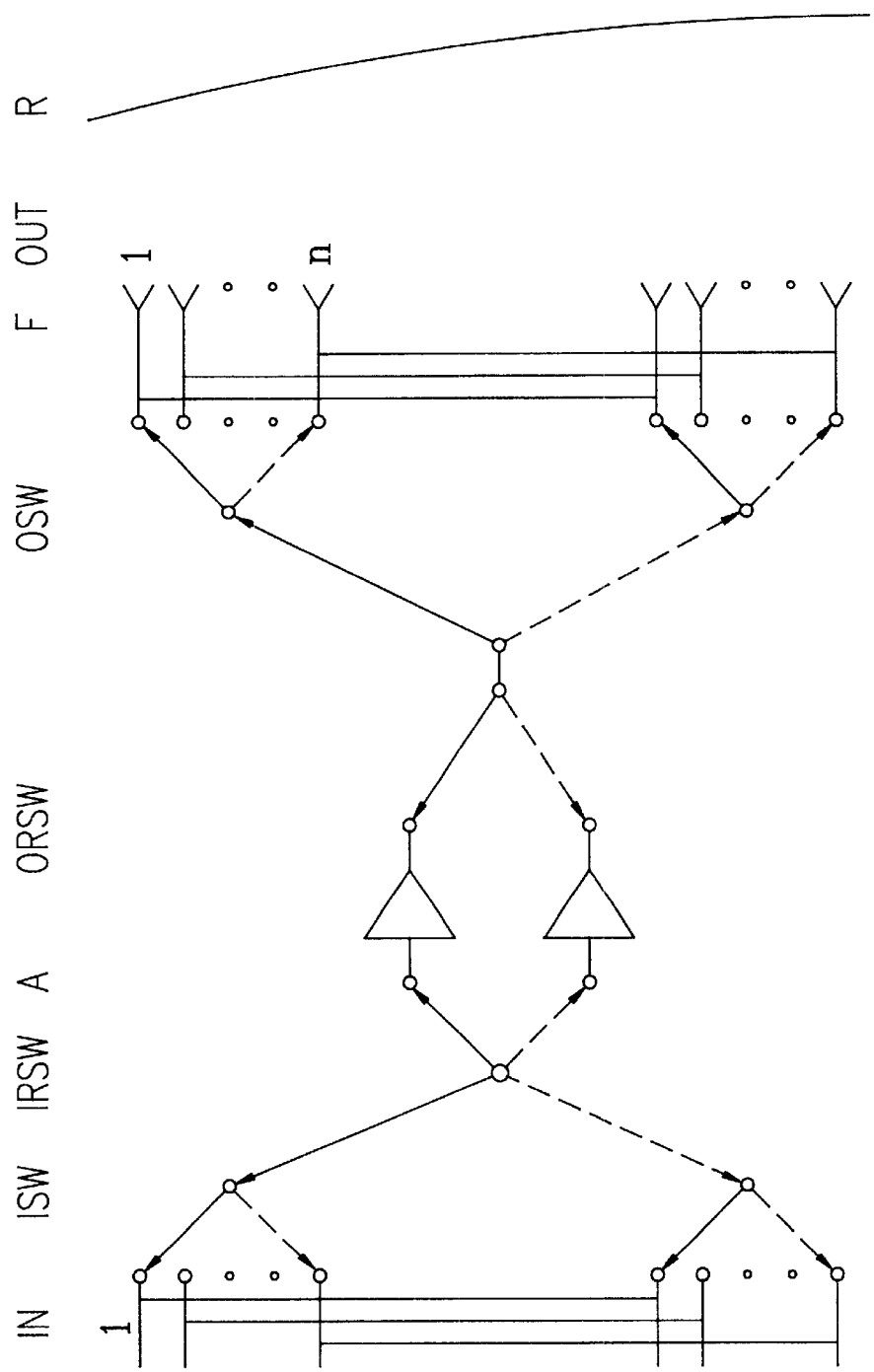
FIG. 2 depicts another embodiment of this invention.

FIG. 2 depicts another embodiment of this invention. FIG. 2 provides redundancy in the amplifiers (A), in the input switches (ISW) and the output switches (OSW) to avoid single point failure, if any, condition depicted in FIG. 1. There are two, one active and the second one a standby, input switches (ISW). There are two, one active and the second one a standby, amplifiers (A). There are two input redundant switches (IRSW). There are two, one active and the second one a standby, output switches (OSW). There are two input redundant switches (IRSW) with thier fixed terminals connected together. There are two switched terminals of each input redundant switch (IRSW). Each switched terminal of the input redundant switch (IRSW) is connected to the fixed terminal of each input switch (ISW) respectively. In the event of a failure of the first input switch (ISW), the second input switch (ISW) is brought into service by switching the first input redundant switch (IRSW). Each switched terminal of the second input redundant switch (IRSW) is connected to the input of respectively each amplifier (A). On the failure of the active amplifier (A), the standby amplifier (A) is switched into service by the second input redundant switch (IRSW). There are two output redundant switches (ORSW) whose fixed terminals are connected together. Each switched terminal of the first output redundant switch (ORSW) is connected to the output of each amplifier (A). On the failure of the active amplifier (A), the second standby amplifier (A) is switched into service by the first output redundant switch (ORSW). The second input redundant switch (IRSW) and the first output redundant switch (ORSW) are switched simultaneously (A) to bring into service the input and the output of the standby amplifier (A). Each switched terminal of the second output redundant switch (ORSW) is connected to each active and standby output switch (OSW) respectively. On the failure of the active output switch (OSW), the standby output switch (OSW) is switched into service by the second output redundant switch (ORSW).

There are 1 through n input (IN) beams. Each of the input (IN) beams are connected to each switched terminal of an input switch (ISW). Each switched terminal of the output switch (OSW) is respectively connected to a transmit feed (F) or feed element. The transmit feeds are located off-set from the prime focus of a transmit reflector (R) antenna. The input switch (ISW) and the output switch (OSW) are switched synchronously. At any one time, the input beam 1 is connected to transmit feed (F) 1 forming an output (OUT) beam 1 which is transmitted by the transmit reflector (R) to a receiving area.1. Next the input (IN) beam 2 is connected to the transmit feed 2 forming an output (OUT) beam 2 which is transmitted by the transmit reflector (R) antenna to another receiving area 2. The input (IN) beams 3 through n are respectively connected to transmit feeds (F) 3 through n forming output (OUT) beams 3 through n which are transmitted by the transmit reflector (R) antenna respectively to 3 through n receiving areas. In another embodiment the transmit feeds (F) are located at or near the prime focus of the transmit reflector (R) antenna. FIG. 1 is a special case of FIG. 2.

The top or the switched terminal 1 of the input switch 2, or the redundant input switch, is connected the top or switched terminal of the input switch 1. The 2nd from top or the switched terminal 2 of the input switch 2 is connected to the 2nd from top or switched terminal 2 of the input switch 1. Each switched terminal 3 through n of the input switch 2 is connected respectively to the switched terminal 3 through n of the input switch 1.

The top or the switched terminal 1 of the output switch 2, or the redundant output switch, is connected the top or switched terminal 1 of the output switch 1. The 2nd from top or the switched terminal 2 of the output switch 2 is connected to the 2nd from top or switched terminal 2 of the output switch 1. Each switched terminal 3 through n of the output switch 2 is connected respectively to the switched terminal 3 through n of the output switch 1.

Figure 3:
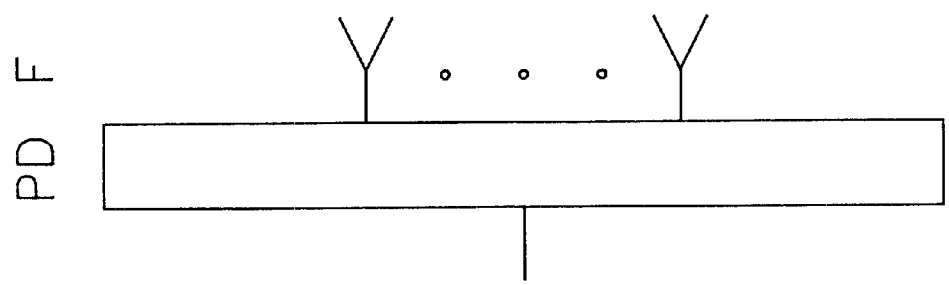
FIG. 3 depicts a design to obtain shaped beams.

FIG. 3 depicts a design to produce shaped output beams and is applicable to all embodiments of this invention. When beams produced by a single feed are used, there is a considerable amount of loss at the crossover points of adjacent beams. To reduce the loss at the crossover points for adjacent beams, shaped beams are produced using two or more feeds. FIG. 3 depicts that the output power is fed to a output power divider having 1 through j outputs which are fed to feeds 1 through j. To produce a shaped beam, j is small number in practice depending on the total number of beams of the system.

Figure 4:
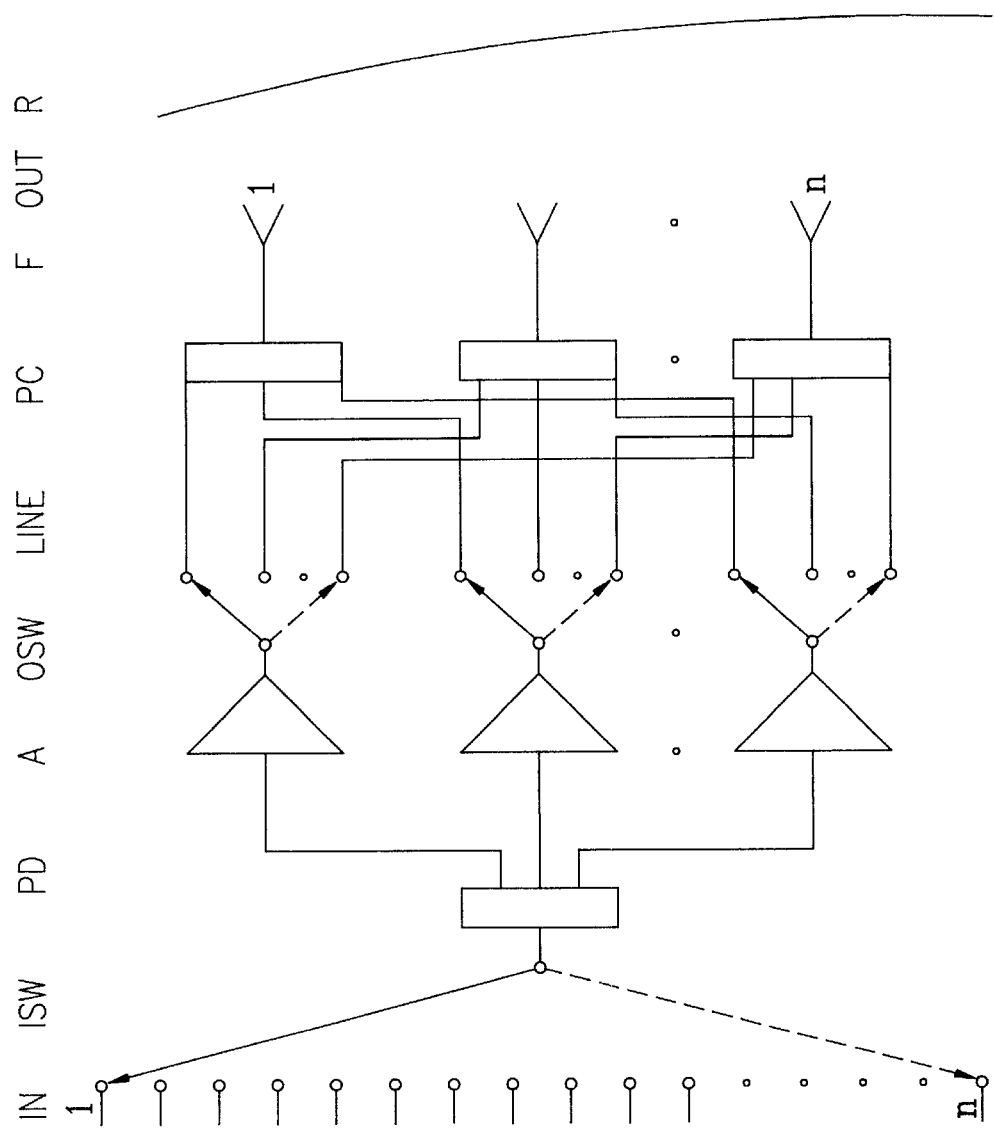
FIG. 4 depicts another embodiment of this invention.

FIG. 4 is another embodiment of this invention where the amplifier output is large, such as in a brodcasting satellite, resulting in possible problems in switching high RF power. There are 1 through n input (IN) beams. Each of the input (IN) beams is connected to each switched terminal of an input switch (ISW). The fixed terminal of the input switch is connected to the input of one to k way input power divider (PD). Output 1 of the power divider is connected to the input of the amplifier 1. Each 2nd through kth outputs of the power divider is connected respectively to each 2nd through kth amplifier (A). The output of the amplifier (A) 1 is connected to the fixed terminal of the output switch (OSW) 1. Each output of 2nd through kth amplifier (A) is connected respectively to the fixed terminal of the 2nd through kth output switch (OSW). Each 1 through kth output switch has 1 through nth switched terminals. The top or the switched terminal 1 of the output switch 1 is connected to an output power combiner (PC) 1. The top or the switched terminal 1 of the output switch 2 is connected to the output power combiner (PC) 1 which has 1 through n inputs and one output. The top or the switched terminal 1 of the output switches 3 through k are connected respectively to the output power combiner (PC) 1. The 2nd through nth switched terminals of each output switch (OSW) 1 through k are connected respectively to the output power combiners (PC) 2 through n. Each output power combiner, 1 through n, has 1 through n inputs and one output. The output of the output power combiner (PC) 1 is connected to a transmit feed (F) 1 or feed element located off-set from the prime focus of a transmit reflector (R) antenna and produces an output beam 1 which is transmitted by the reflector antenna to a receiving area. The output of the power combiner (PC) 2 is connected to a transmit feed (F) 2 or feed element located off-set from the prime focus of the reflector antenna and produces the output beam 2 which is transmitted by the reflector antenna to a receiving area 2.

The outputs of each of the output power combiner 3 through n are connected to to each transmit feed (F) or feed element 3 through n respectively located off-set from the prime focus of the reflector (R) antenna and produce output beams 3 through n which are transmitted by the transmit reflector (R) antenna to receiving areas 3 through n respectively.

Each input beam, input switches, input power divider, amplifiers, output switches, output power combiners, transmit feeds are connected together to produce each output beam, corresponding to each input beam, which is transmitted by the transmit reflector antenna to each receiving area respectively. FIG. 1 is a special case of FIG. 4.

There are 1 through q transmit reflector antennas. There are one through r transmit feed elements in each reflector antenna. The feeds are located off-set from the prime focus of the reflector antenna to (1) avoid blockage of the reflector antenna and (2) reduce the level of the sidelobes. In another embodiment the feeds are located at or near the prime focus of the transmit reflector (R) antenna.

In another embodiment of this invention, a portion or the entire system is implemented in a monolithic microwave integrated circuit (MMIC) technology. Another objective of this invention is to use a conductive deposition of a film of single crystal high Tc superconductor, such as YBCO, TBCCO, for a portion or the entire system and operate the system at a high superconducting temperature, currently between 75 and 105 degrees Kelvin, and thus reduce the conductive losses of the system. U.S. Pat. No. 5,409,889 includes a MMIC high Tc superconducting microwave device.

Another embodiment is a very low conductive loss high Tc superconductive waveguide multibeam transmitters. All the components, in the waveguide embodiment, are made of a single crystal high Tc superconductor such as YBCO, TBCCO. The waveguide feed elements and the reflector antenna are also made of a single crystal high Tc superconductor including YBCO, TBCCO. In another waveguide embodiment, all the components, including waveguide feed elements are made of a single crystal dielectric material, such as sapphire, lanthanum aluminate, having interior surfaces which are deposited with a film of a single crystal high Tc superconductor such as YBCO, TBCCO. The reflector antenna is also made of a single crystal dielectric material such as sapphire, lanthanum aluminate, having reflecting surfaces which are deposited with a film of a single crystal high Tc superconductor. The high Tc superconducting transmitters are operated at a high superconducting temperature currently above 77 degrees K. A Q of one million, for high Tc superconducting microwave devices, has been demonstrated. G. Shen, C. Wilker, P. Pang and W. C. Holstein, "High Tc Superconducting-sapphire Microwave resonator with Extremely High Q-Values up To 90 K," IEEE MTT-S, Digest, pp. 193–196, 1992. U.S. Pat. Nos. 5,407,904 and 5,407,905 have been issued on high Tc superconducting microwave devices.

There are 1 through n receive beams each having a service area. In each service area there are 1 through z receiving terminals. For example, for the INTELSAT standard A earth station, there is generally one or two earth station(s) for each receiving beam. On the other hand, for a regional cellular satellite system, a receiving service area may have one or more million(s) of terminals depending on the location. A receiving station is comprised of a receiving antenna and a receiver. For a standard A earth station of INTELSAT, the receiving antenna is a paraboloid with a prime focus receiving feed and a complex receiver. For a regional cellular satellite system, the receiving terminal is generally a hand held receiver with a simple quarter wave or a dipole antenna attached to it.

FIG. 5 depicts one receiving area illuminated by one output beam. It contains a receive reflector (R) antenna which receives the output beam and focusses it to a prime focus receive feed element (F) which is connected to a receiver (RCVR). For a large antenna earth station, one or two such stations are located in a receiving area. For a Very Small Antenna Terminal (VSAT) station, such as in a broadcasting satellite receive system, there are many such terminals located in each receiving beam area. For a cellular satellite system, the entire receiving antenna, feed and a receiver are combined in one, preferably hand held, unit. There are many such units located in one cellular satellite receiving area.

It should be understood that the foregoing disclosure relates to only typical embodiments of this invention. and that numerous modifications or alternatives may be made therein, by those of ordinary skill, without departing from the spirit and scope of this invention as set forth in the appended claims. The invention includes different types of government and commercial telecommunication systems, satellites, regional cellular satellites, broadcasting satellites, domestic satellites, Globalstar satellites, Odyssey satellites, Teledesic satellites, Eutelsat, terrestrial systems, shipboard systems, aircraft systems, number of beams, all RF, microwave and millimeter wave frequencies, all waveguide embodiments, coaxial embodiments, microstrip embodiments, MMIC embodiments, use of multilayer boards, combination of waveguide, coaxial, microstrip, different types of connecting input and output lines, different types of feed elements, different types of power dividers and combiners, different types of switches such as semiconductor, ferrite and ferroelectric type, different types of reflector antennas and receivers.

What is claimed is:

1. A transmit-receive telecommunication system comprising of:
   a multibeam transmit system comprising:
   a plurality of input beams, 1 to n, forming a first set;
   a second set of unput beams, 1 to n, is connected in parallel to said first set respectively;
   two input switches;

each switch has 1 to n switched terminals;
each switch switches a set of said input beams respectively;
two input redundant switches;
each input redundant switch has a fixed terminal;
said first input redundant switch switches between said input switches;
said fixed terminals of said input redundant switches are connected together;
two amplifiers each having an unput and an output;
said second input redundant switch switches between the inputs of said amplifiers;
two output redundant switches;
each said output redundant switch has a fixed terminal;
said first output redundant switch switches between the outputs of said amplifiers;
said fixed terminals of said output redundant switches are connected together;
two output switches each having switched terminals 1 to n;
said second redundant switch switches between said output switches;
a plurality of transmit feeds, 1 to n, forming a first set;
a second set of transmit feeds 1 to n, connected in parallel with said first set of transmit feeds respectively;
each said output switch switches a set of transmit feeds respectively;
said transmit feeds are located offset from the prime focus of a transmit reflector antenna thus forming output beams 1 to n;
said input and said output switches are switched synchronously at a constant rate;
input beams 1 to n produce output beams 1 to n respectively;
only two amplifiers amplify signals from n input beams reducing the weight of said transmitting system;
only two amplifiers amplify signals from n input beams reducing the power requirements of said transmitting system;
only two amplifiers amplify signals from n input beams reducing the cost of said transmitting system;
a plurality of receiving areas 1 to n;
output beams 1 to n form receiving areas 1 to n respectively;
a receiving area containing:
  a plurality of receiving systems 1 to k;
  a receiving system comprising a receive feed located at the prime focus of a receive reflector antenna; and
  a receive feed is connected to a receiver.

2. A transmit-receive telecommunication system of claim 1:

wherein said input switches, said input redundant switches, said amplifiers, said output redundant switches are made in a microwave monolithic integrated circuit (MMIC).

3. A transmit-receive telecommunication system of claim 2:

wherein the lines of said MMIC is comprised of a film of single crystal high Tc superconductor; and
said multibeam transmit system being operated at a high superconducting temperature.

4. A transmit-receive telecommunication system of claim 1:

wherein said multibeam transmit system is made of waveguides.

5. A transmit-receive telecommunication system of claim 1:

wherein the transmit system is a cellular satellite system; and
said receiving areas are comprised of hand held transmit-receive equipment.

* * * * *